United States Patent [19]

Holtslag et al.

[11] Patent Number: 5,677,903
[45] Date of Patent: Oct. 14, 1997

[54] MULTI-LAYER INFORMATION STORAGE SYSTEM WITH IMPROVED ABERRATION CORRECTION

[75] Inventors: Antonius H. M. Holtslag; Derk Visser; Peter Coops; Jacobus P. J. Heemskerk, all of Eindhoven, Netherlands

[73] Assignee: U.S. Phillips Corporation, New York, N.Y.

[21] Appl. No.: 299,861

[22] Filed: Sep. 1, 1994

Related U.S. Application Data

[63] Continuation-in-part of Ser. No. 674,493, Mar. 25, 1991.
[51] Int. Cl.$^6$ .................................................. G11B 7/00
[52] U.S. Cl. ........................................ 369/112; 369/94
[58] Field of Search ................................ 369/112, 118, 369/103, 44.21, 44.25, 44.23, 94, 95, 13, 44.14, 93

[56] References Cited

U.S. PATENT DOCUMENTS 3,946,367  3/1976  Wohlmut et al. .................... 340/173
5,097,464  3/1992  Nishiuchi et al. .................... 369/112

FOREIGN PATENT DOCUMENTS 60-202545  10/1985  Japan .
63-096745  4/1988  Japan .

*Primary Examiner*—Muhammad N. Edun
*Attorney, Agent, or Firm*—David R. Treacy

[57] ABSTRACT

An optical information storage system has a multi-recording layer record carrier and a scanner device for the carrier. The scanner produces a radiation beam which is compensated for spherical aberration for a single height of the scanning spot with the stack of layers. The height of the stack is determined by the maximum spherical aberration permissible for the system. The number of layers in the stack is determined by the minimum distance between layers, which depends on the crosstalk in the error signals due to currently unscanned layers.

14 Claims, 5 Drawing Sheets

MULTI-LAYER INFORMATION STORAGE SYSTEM WITH IMPROVED ABERRATION CORRECTION

CROSS-REFERENCE TO RELATED APPLICATIONS

This application is a continuation-in-part of co-pending application Ser. No. 07/674,493 filed Mar. 25, 1991 by Antonius H. M. Holtslag for METHOD OF AND APPARATUS FOR OPTICALLY WRITING, READING AND ERASING A MULTI-PLANE RECORD CARRIER, AND RECORD CARRIER SUITABLE FOR SAID METHOD AND APPARATUS, assigned to the assignee of the instant application.

BACKGROUND OF THE INVENTION

1. Field of the Invention

The invention relates to a method of optically writing and subsequent reading and/or erasing information in a recording plane of an optical record carrier having at least two recording planes and a guide plane. A guide beam focused to a spot (guide focus) in the guide plane is used during writing, and at least one write beam focused to a writing spot (write focus) in the recording planes, the guide focus and the write focus being formed by one objective system and the guide focus being held in the guide plane by means of a focus error signal generated by the guide beam.

A multi-layer record carrier comprises a stack of information layers separated from one another by spacer layers, in which each information layer may comprise information. The large information storage capacity of such a record carrier increases its convenience of use compared to single-layer record carriers and reduces the price of the medium per unit of information. Each information layer can be scanned independently of the other information layers by means of a radiation beam. Dependent on the type of record carrier, information can be written into an information layer during scanning and/or information already written can be read or erased. The information layers in a stack can be scanned by means of a radiation beam which is incident from one side on the record carrier. For scanning the separate information layers, the height, or axial position, of the scanning spot formed by the radiation beam is varied. The information contents of the record carrier may be further increased by implementing the record carrier as a two-sided record carrier. Then a stack of information layers is present at both sides of the record carrier, and each stack can be scanned from a different side of the record carrier. A stack of information layers may be provided on a substrate which should be transparent if the stack is scanned through the substrate.

2. Description of the Prior Art

A method of the type mentioned in the opening paragraph is described in Japanese Patent Application 63-234418. In accordance with this method an objective system converges a guide beam to a guide focus on a guide plane in a record carrier. A focus servosystem controls the objective system in such a way that the guide focus remains in the guide plane in spite of possible excursions of the record carrier. A read or write beam, or generally a scanning beam, is focused by the objective system on a recording plane to be written or read, which plane is parallel to the guide plane. For this purpose the read/write focus of a read/write beam formed by the objective system must be displaceable with respect to the guide focus in the longitudinal direction, i.e. in the direction of the optical axis. Starting from a reference position of the scanning focus, which reference position is equal to the desired position of the guide focus, this is realised by displacing the radiation source supplying the scanning beam along the optical axis over discrete distances which match the distances between the recording planes.

To be able to use the known method with a so-called passive longitudinal adjustment of the scanning focus, the different recording planes of the record carrier must be very accurately parallel to the guide plane within the focus depth of the objective system, because otherwise the scanning focus is not always located in a recording plane to be scanned. A multilayer record carrier having such a high degree of parallelism of the layers is difficult to manufacture and is consequently expensive. Moreover, during writing, the scanning focus should accurately follow a given track in a recording plane to be scanned, while during reading the scanning focus should accurately follow the written information tracks. Japanese Patent Application 63-234418 does not reveal how this so-called transversal positioning of the scanning focus must be realised.

An information storage system of the type described in the opening paragraph is known from European Patent Application no. 0 517 491, in which a device is described for reading information layers in a multi-layer record carrier. The device is provided with an adjustable spherical aberration compensator for compensating the spherical aberration incurred by the radiation beam of the device when it passes through the material of the record carrier. Since the information layers are located at different heights in the record carrier, the device employs a specific setting of the compensator for each information layer. A drawback of this known information storage system is that there should be a separate compensation for each information layer. A compensator which can realise this is complicated and relatively expensive. The relatively low cost of the record carrier per unit of information is thus counteracted by a relatively expensive scanning device.

SUMMARY OF THE INVENTION

An object of the invention is to provide a method and apparatus of the type described in the opening paragraph in which a record carrier which can easily be manufactured can be used and in which the transversal positioning problem is also solved.

Another object of the invention to provide an information storage system having a relatively low price and at the same time a high information density.

The Method

In accordance with a first aspect of the invention the method is characterized in that during writing the transversal position of the write focus in a recording plane is coupled to the transversal position of the guide focus, the latter position being controlled by a tracking error signal obtained from the cooperation between the guide beam and the guide plane, and in that during reading and/or erasing:
a) a read focus formed by a read beam is held in the scanned recording plane by means of a focus error signal obtained from the cooperation between the read beam and the scanned recording plane,
b) the focusing means introduce such a fixed, stack-associated spherical aberration in the radiation beam that this aberration compensates the spherical aberration incurred by the radiation beam when it is focused at approximately half the height of the stack of information layers, and c) the transversal position of the read focus is controlled by a tracking error signal obtained from the cooperation between the read beam and the scanned recording plane.

The invention is based on the recognition that the transversal position of the write focus can be controlled by coupling this position to that of the guide focus by means of guide information in only one plane of the record carrier when writing all recording layers, and that the read focus can be controlled independently of the guide focus when reading written recording layers. Further, a stack of information layers can be scanned by a satisfactorily corrected scanning spot, while using a single, constant and suitably chosen spherical aberration compensation. Since the spherical aberration is not compensated anymore for each information layer individually as in the known system, the focusing means can be made simpler, reducing the cost of the scanning device. The spherical aberration incurred by a focused radiation beam as a function of the thickness of the material through which the beam passes appears to be sufficiently small for a reasonably large range of thicknesses, which range is located symmetrically around the thickness for which the radiation beam is well compensated. By compensating the radiation beam in such a way that the scanning spot is substantially free from spherical aberration at approximately half the height of the stack, it is possible to scan information layers located within said range at both sides of this half height with a sufficiently low spherical aberration. This provides the possibility of scanning a stack of information layers by means of a scanning beam which is compensated once for spherical aberration. A device suitable for scanning a record carrier having a single stack then only needs a single, fixed spherical aberration compensation. Since this compensation can be built into a component which is already present in the device, for example an objective lens of the focusing means, the construction of the device can be simplified considerably.

It is to be noted that the abstract of the Japanese Patent Application no. 60-202 545 describes an information storage system in which the scanning spot of a radiation beam can be varied in height so as to focus on one of the information layers, located at different heights, of a record carrier. However, this publication does not describe the problems which are caused by spherical aberration due to the different heights of the information layers and consequently does not indicate how this aberration should be compensated for.

Since the spherical aberration due to the traversed material thickness of the record carrier is dependent on the refractive index of the material and on the numerical aperture of the radiation beam, the size of the above-mentioned range of sufficiently small spherical aberration will also depend on these parameters. Since the height of the outermost information layers should be within this range for a correct scanning, the maximum thickness of the stack is preferably a function of the refractive index of the material of the stack and of the numerical aperture of the focusing means.

The size of the range of sufficiently small spherical aberration within which information layers can still be scanned with a sufficient quality is determined by the admissible deterioration of the quality of the scanning spot, as determined by the scanning device. The deterioration leads to a less satisfactory detection of electric signals derived from the radiation coming from the record carrier. The deterioration which is maximally admissible for a specific information storage system may be expressed in terms of the Strehl intensity. The Strehl intensity is the normalized maximum intensity of the radiation distribution of the scanning spot. If there are no aberrations, the Strehl intensity is 1, and for large aberrations the Strehl intensity goes towards 0. If the maximally admissible decrease of the Strehl intensity due to spherical aberration is given by r, the size of the range depends on r and the maximum thickness of the stack preferably depends also on r.

The thickness of the stack is preferably smaller than the value 2d defined by the equation $$2d = \frac{34\, n^3 \lambda \sqrt{r}}{(n^2 - 1)(NA)^4}$$

in which n is the refractive index of the spacer layers, $\lambda$ is the vacuum wavelength of the radiation beam and NA is the numerical aperture of the focusing means. If the information layers have such a thickness that the beam is also noticeably influenced by the refractive index of the information layers, the parameter n should be a weighted average of the refractive indices of the spacer layers and the information layers instead of the refractive index of the spacer layers. If the refractive indices of the spacer layers and/or those of the information layers are different, the parameter n should be a weighted average of these different refractive indices.

If the information layers are scanned through a transparent substrate, the spherical aberration caused in this substrate should also be compensated for in the focusing means. Generally, the substrate has small thickness variations within a certain thickness tolerance. If the spherical aberration due to a substrate having a nominal thickness is compensated for, the thickness variations give rise to uncompensated spherical aberration in the radiation beam. This extra spherical aberration takes up a part of the above-mentioned maximally admissible spherical aberration of the information storage system, so that the admissible spherical aberration incurred in the stack is reduced. An information storage system in which scanning through a substrate is realised and in which the extra spherical aberration is taken into account is characterized in that the thickness of the stack is smaller than 2d minus the thickness tolerance of the substrate.

The guide focus is held on a track in the guide plane by a tracking servo. During writing, when there are still no tracks in the recording plane, the write focus is coupled to the guide focus as regards the transversal position, i.e. the position in a direction perpendicular to the optical axis as well as to the tracks. During reading the guide focus is held on the written tracks by means of an active control in the transversal direction. The read focus is then also actively focused on the recording plane to be read.

It is to be noted that Japanese Patent Application 63-298836 describes a method using a guide beam and a write beam. However, each of these beams is focused by a separate objective system so that the coupling between the two beams cannot be realised with sufficient accuracy. Moreover, the latter Patent Application does not describe the writing and reading of record carriers having various recording planes.

If the method according to the invention is further characterized in that the read beam used during reading or erasing is constituted by the guide beam, it can be implemented with a small number of means and the apparatus for performing the method can be simplified.

For writing a recording plane in a record carrier in which the recording planes are constituted by surfaces of separate recording layers which are separated by spacer layers, the method is preferably characterized in that the write focus is held in the recording plane by means of a focus error signal which is obtained from the cooperation of the write beam with the scanned recording plane. The write beam will then remain satisfactorily focused on the recording plane, even if the guide plane and the recording plane are not parallel within a focus depth.

For writing a recording plane in an unlaminated record carrier the method is preferably characterized in that the longitudinal position of the write focus is guided by the longitudinal position of the guide focus, the distance between the two positions being determined by the ordinal number of the recording plane to be written. Use of this method leads to a record carrier in which one or more recording planes are formed.

The Apparatus

A second aspect of the invention relates to an apparatus for performing the method, which apparatus comprises at least one radiation source for supplying a guide beam and at least one write beam, an objective system for focusing the guide beam to a guide focus as well as for focusing the write beam to a write focus, and a first servosystem for longitudinally positioning the guide focus in the guide plane. Such an apparatus is known from the afore-mentioned Japanese Patent Application 62-68207. The drawback of this apparatus is that the read/write beam does not have any independent servosystems for longitudinally and transversely positioning the read/write focus.

Another object of the invention is to provide an apparatus which does not have these drawbacks. This apparatus is characterized in that it comprises a second servosystem for transversely positioning the guide focus in the guide plane, a coupling of the control of the transversal position of the write focus to the second servosystem, a read tracking servosystem and a read focus servosystem for transversely and longitudinally positioning, respectively, a read focus formed by a read beam, said servosystems using a tracking error signal and a focus error signal, respectively, generated by means of the read beam. Spherical aberration is corrected as described below.

The second servosystem holds the guide beam on the tracks in the guide plane. During writing the transversal position of the write focus is coupled to that of the guide focus because there is no tracking information in an unwritten recording plane. During reading the read focus must be held on the tracks in the recording plane by its own tracking servosystem. A coupling of the transversal position of the read focus to that of the guide focus as used during writing cannot be used during reading because the transversal positioning of the write focus with respect to the guide focus during writing cannot be reproduced with sufficient accuracy during reading. For similar reasons the read beam must have its own focus servosystem. To this end an embodiment of the apparatus according to the invention for writing a record carrier in which the recording planes are constituted by surfaces of separate recording layers which are separated by spacer layers is characterized in that the apparatus comprises a third servosystem for longitudinally positioning the write focus in a recording plane, using a focus error signal which is supplied by the write beam. By virtue of the third servosystem the write focus remains in the recording plane, independent of the parallelism of the recording plane and the guide plane.

A further embodiment of the apparatus according to the invention for writing a recording plane in an unlaminated record carrier is characterized in that the apparatus comprises a coupling of the control of the longitudinal position of the write focus to the first servosystem. In an unlaminated record carrier a recording plane is not formed until the information is written. Prior to writing, the recording plane is not present so that a write focus cannot be adjusted. For this reason the longitudinal position of the write focus must be coupled to the guide focus during writing.

An embodiment of the apparatus according to the invention may be further characterized in that the third and a fourth servosystem determine the longitudinal and transversal positions, respectively, of the read focus. Reading and writing can then be effected by means of the same radiation beam. In this case the apparatus requires only four servosystems for the guide, write and read beams.

A preferred embodiment of the apparatus according to the invention is characterized in that the first and second servosystems determine the longitudinal and transversal positions, respectively, of the read focus. The same radiation beam can now be used as a guide beam and as a read beam. The apparatus then only requires three servosystems.

To be able to separate the different radiation beams in the apparatus in order to detect them separately, the beams may have a different wavelength, a different state of polarization or a different spatial direction, or a combination thereof.

If the detection systems for the guide beam and read or write beam on the one hand and the radiation sources on the other hand are located at different sides of the record carrier, the advantage is obtained that the power of a radiation beam to be detected is independent of the ordinal number of the scanned recording layer.

When using multiple recording plane record carriers, it is necessary to detect a recording plane having a desired ordinal number. When writing and reading a multilayer record carrier it is not sufficient for the scanning beam, or write/read beam, to be exactly focused on a recording plane, but it is at least as important that the correct, i.e. selected plane is focused. An apparatus providing this possibility is characterized by a recording plane selector which comprises a plane discriminator connected to the output of a focus error detection system of the scanning beam, a counter connected to said discriminator and a comparison circuit for comparing the counter contents with the ordinal number of a recording plane to be scanned.

The plane selection method used in this apparatus differs considerably from and is more reliable than that described in Japanese Patent Application 62-68207, which works with fixed longitudinal distances between the scanning focus and the guide focus.

The presence of the focus servosystem for the read focus is a previously mentioned aspect of the invention. The signal supplied by the focus error detection system comprises information about the presence of a recording plane on or near the scanning focus. When the scanning focus is moved through the recording planes, the plane discriminator can derive a pulse from the above-mentioned signal at any instant when a recording plane passes through the scanning focus. With reference to these pulses and the direction of movement of the scanning focus the counter determines the ordinal number of the recording plane passing the scanning focus. In this way it is possible to focus the scanning beam on any desired layer. The plane selection method according to the invention is applicable to all apparatuses for writing, reading or erasing multilayer optical record carriers which actively focus on the different recording planes in the record carrier.

The second aspect of the invention includes provision for correction of optical aberrations in the scanning beam for the different longitudinal positions of the scanning focus in the record carrier. The thickness of the record carrier traversed by the scanning beam, from the outside surface to the scanning focus, is dependent on the ordinal number of the recording plane to be scanned. This variable thickness introduces a variable quantity of spherical aberration in the scanning beam, which spherical aberration detrimentally influences the shape of the scanning focus. In the case of thickness variations of more than approximately 100 μm the scanning beam must be corrected so as to maintain a satisfactory quality of the scanning focus. To this end an apparatus in accordance with this aspect of the invention is characterized in that the apparatus includes at least one spherical aberration corrector for an adjustable correction of spherical aberration in the scanning beam, the magnitude of the correction being dependent on the refractive index and the thickness of the material of the record carrier in the optical path of the scanning beam between the objective system and the scanned recording layer. A particular embodiment of such an apparatus is characterized in that the spherical aberration corrector having an adjustable correction is a transparent plate comprising a plurality of areas of different thicknesses, each time one of said areas being present in the path of the scanning beam. Plane-parallel plates of, for example, glass or plastics material can easily be used to correct the spherical aberration for any recording plane to be scanned.

It is to be noted that U.S. Pat. No. 3,999,009 also describes an apparatus for scanning a multilayer record carrier, which apparatus has a transparent plate which can be introduced into the scanning beam. This plate is intended to move the scanning focus longitudinally, with the objective system being stationary. In contrast to the plate according to the invention, the known plate does not correct the spherical aberration, but aggravates it. A further difference between the two plates is that the known plate should become thicker to move the scanning focus away from the objective system, and that the plate according to the invention should become thinner.

The spherical aberration corrector may be generally used in an apparatus for scanning multilayer record carriers, not only in an apparatus using a guide beam and a scanning beam, but also in an apparatus without a guide beam.

The invention also relates to a device for scanning information layers of an optical record carrier, which device is provided with a radiation source, focusing means for selectively focusing a radiation beam from the radiation source on separate information layers, and a focus servosystem comprising a focus detection system having a radiation-sensitive surface. Currently unscanned information layers yield a relatively large defocused, parasitic radiation spot on the radiation-sensitive surface. To minimize the crosstalk due to this parasitic spot on the focus error signal, the radiation-sensitive surface should be small. On the other hand, the radiation-sensitive surface should have a certain minimum dimension to enable it to generate a satisfactory focus error signal. According to the invention, the device is therefore characterized in that the radiation-sensitive surface has a largest dimension ranging between 1.5 and 3 times the diameter of the radiation spot formed on the radiation-sensitive surface when the radiation beam is optimally focused on the information layer to be scanned. The above-mentioned 8 μm peak-to-peak distance of the S curve can be realised with such a focus detection system. The maximum dimension of the radiation-sensitive surface is preferably approximately equal to twice the diameter of said radiation spot. It is possible to use a detection system with a relatively large radiation-sensitive surface while meeting the above dimensional requirement by arranging a diaphragm in the radiation beam, restricting the extent of the area of the radiation-sensitive surface on which radiation is incident. The reduction of the crosstalk between the focus error signals makes it possible to reduce the minimum distance between the information layers.

Generally, a device for scanning record carriers is provided with a tracking servosystem for causing the scanning spot of the radiation beam to follow information layer tracks in which the stored information is arranged. Such a servosystem will also be influenced by crosstalk due to currently unscanned information layers situated proximate to the scanning spot. To minimize this influence, the radiation-sensitive surface of the tracking detection system preferably has a dimension ranging between 1 and 3 times the diameter of the radiation spot on the tracking detection system when the radiation beam is optimally focused on one of the information layers. Such a device is particularly suitable for integration in a storage system according to the first and second aspect of the invention.

Some types of the device are provided with dividing means located in the optical path between the radiation source and the focusing means for generating two servobeams and one main beam from the radiation beam, the two servobeams being used for generating a tracking error signal. According to the invention, crosstalk of tracking error signals can be reduced in such a device by choosing the power in the main beam to be smaller than six times, and preferably 4 times, the power in each of the servobeams. The crosstalk appears to be caused by parasitic radiation of the main beam reflected by an information layer which is not to be scanned currently and is incident on the servodetection system. In the device according to the invention the amount of radiation in the servobeams is larger than the amount of parasitic radiation of the main beam at the location of the radiation-sensitive detectors of the tracking detection system. This reduces the influence of the parasitic radiation and thus the crosstalk, thereby allowing a smaller spacer thickness.

The Record Carrier

The method and apparatus according to the invention provide the possibility of using a record carrier which cannot only be written in a well-defined manner but also be read satisfactorily. This record carrier is characterized in that the record carrier has a recording layer of such a thickness that it can be provided with different recording planes which can be scanned separately. Such a thick recording layer can be made at a lower cost than a stack of recording layers and intermediate layers. The recording planes are not formed until the thick recording layer is written.

A preferred embodiment of the record carrier is characterized in that the guide plane has an inscribable layer. The number of recording planes in the recording layer is extended by one by providing the guide plane with a sensitive layer.

A further preferred embodiment of the record carrier is characterized in that the guide plane comprises non-erasable information which has been prerecorded during the production of the record carrier. The non-erasable information enhances the facilities of use of the record carrier and provides, for example, the possibility of distributing standard data or programs. The non-erasable information can be laid down in the guide plane simultaneously with the tracking information by means of a stamping process, as described in, for example GB Patent Application 2,036,410.

The information in the recording planes is preferably coded in accordance with a self-clocking recording code. Since the recording planes do not comprise any synchronizing marks provided during production, the clock for decoding the signal which has been read from the written information in the recording planes, must be generated by the apparatus itself from said signal.

Still another aspect of the invention is related to rendering the information contents of a record carrier as large as possible by maximizing the number of information layers. However, the number of information layers fitting in a stack is limited by the maximum thickness of the stack on the one hand and by the required minimal mutual distance of the information layers on the other hand. The minimum mutual distance is determined by crosstalk of the information layers, i.e. the quality of signals generated from radiation coming from a layer to be scanned is detrimentally influenced by radiation coming from other information layers. The extent of influence is dependent on the type of signal. The minimum distance between information layers for an acceptable crosstalk between the information signals of the different layers is known from European Patent Application no. 0 605 924 which is herein incorporated by reference. Notably, servo-error signal crosstalk gives rise to additional requirements for the minimum distance. In a focus servosystem, with which the device keeps the scanning spot on the information layer to be scanned, the shape of the S-curve, i.e. the response curve of the focus servosystem as a function of the distance between the scanning spot and the information layer, is influenced by a neighbouring information layer. The S-curve generally has a positive and a negative extreme, while the zero crossing in between is the point towards which the servosystem controls the position of the scanning spot. In accordance with the invention, the thickness of each spacer layer in the stack ranges between 1.5 and 4 times the refractive index of the spacer layer multiplied by the peak-to-peak distance of the S-curve of the focus servosystem. A thickness below said range gives rise to a large crosstalk, whereas a thickness above said range gives an unnecessary decrease of information density of the record carrier. The height is preferably approximately twice the refractive index of the spacer layer multiplied by the peak-to-peak distance. The minimum height of a spacer layer is approximately 18 n µm for a focus servosystem with a peak-to-peak distance of 12 µm. A special focus servosystem designed for scanning multi-layer record carriers has a peak-to-peak distance of 8 µm, so that the minimum thickness of the spacer layer is 12 n µm. Although the features of the second aspect of the invention can be advantageously implemented in an information storage system with the specific correction of the spherical aberration according to the first aspect of the invention, the application is not limited thereto.

The invention further relates to an optical record carrier having a plurality of information layers at different heights in the record carrier, which information layers are separated by spacer layers, which record carrier is suitable to be read by means of a focused radiation beam employing a fixed spherical aberration compensation. According to the invention, the record carrier is characterized in that the distance between the highest and lowest information layer is smaller than a value 2d defined by $$2d = \frac{34 n^3 \lambda \sqrt{r}}{(n^2 - 1)(NA)^4}$$

in which n is the refractive index of the spacer layers, $\lambda$ is the vacuum wavelength of the focused radiation beam, NA is the numerical aperture of the focused radiation beam and r is 0.05. The numerical aperture of a beam is equal to the sine of the half apex angle of the beam in vacuo. Such a record carrier can be scanned by a relatively cheap scanning device, thereby reducing the cost of the information storage system.

A system in which stringent requirements are imposed on the quality of the scanning spot requires a record carrier in which the height of the stack is smaller than has been indicated in the previous paragraph. According to the invention, such a record carrier is characterized in that the value of r is 0.01.

DESCRIPTION OF THE PREFERRED EMBODIMENT

Figure 1A:
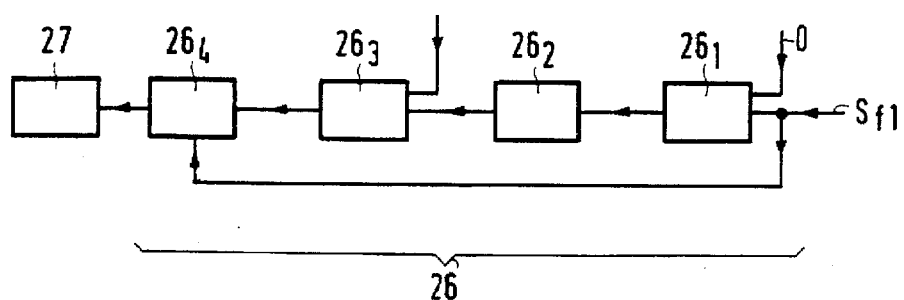
FIG. 1a shows an embodiment of a plane selector.
Figure 1B:
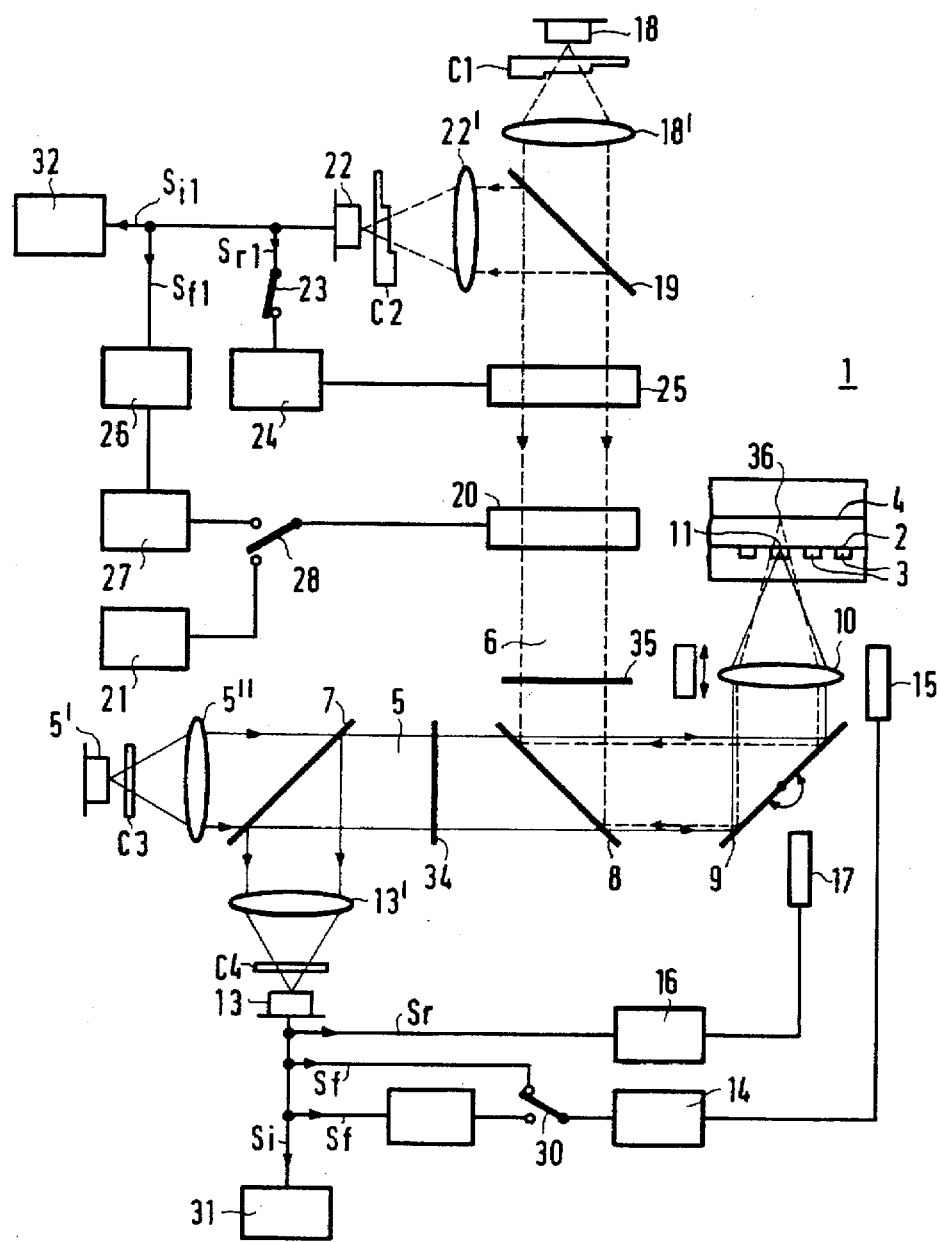
FIG. 1b shows an embodiment of a first apparatus according to the invention.

FIG. 1b shows a part of an optical record carrier 1 in a cross-section. The record carrier has a reflecting surface defining a guide plane 2 provided with guide tracks 3 which are perpendicular to the plane of the drawing. These guide tracks are provided in the guide plane during the manufacture of the record carrier and may consist of, for example, continuous grooves or of series of pits in the guide plane. The record carrier also comprises various recording planes 4 one of which is shown in the drawing, intended for recording (user) data. The guide tracks of the guide plane are not copied in the recording planes.

The apparatus for writing and reading information, for example, data in this record carrier uses two radiation beams, a guide beam 5 and a scanning beam 6. The guide beam 5 is shown in the drawing by means of solid lines and the scanning beam 6 is shown by means of broken lines. In parts of the optical path where the two beams may coincide, the solid line and the broken line are shown juxtaposed, just to indicate that there are two beams.

The guide beam is generated by a radiation source 5' arranged in the focus of a lens 5" and passes to an objective system 10 via a mirror 9. This system focuses the guide beam on the guide plane 2 of the record carrier. In order to keep the guide focus 11 of the guide beam in the guide plane when the record carrier is moving, the longitudinal position of the focus, i.e. the position along the principal axis of the beam, must be actively controlled. To this end radiation reflected by the guide plane and captured by the objective system is passed from the guide beam to a first detection system 13 via a beam-separating element 7, for example, a partially transparent mirror, and a lens 13'. The output of this system supplies a focus error signal Sf, i.e. a signal which is representative of the distance between the guide plane and the plane in which the guide beam is focused by the objective system. The focus error signal controls a linear motor 15 via a switch 30 and a first servo amplifier 14, which motor determines the longitudinal position of the objective system 10 and hence that of the guide focus 11. The detection system 13, the amplifier 14, the motor 15 and the objective system 10 jointly constitute the first servosystem of the apparatus. This first servosystem ensures that the guide beam 5 is always exactly focused on the guide plane 2. This is necessary to ensure optimum detection in the guide information present in this plane so that, inter alia, the guide focus 11 always follows a desired track 3 in the guide plane.

This tracking is possible because the detection system 13, which captures the guide beam radiation reflected by the guide plane, also supplies a so-called tracking error signal Sr. This signal is representative of the extent to which the centre of the guide focus coincides with the centre line of a track to be followed in the guide plane. The signal Sr controls a pivot-drive member 17 for the pivoted mirror 9 via a servo amplifier 16. By pivoting this mirror about an axis perpendicular to the plane of the drawing, the guide focus can be displaced in the transversal direction, i.e. in a direction in the guide plane and transverse to the track direction. The detection system 13, the amplifier 16 and the drive member 17 with the mirror 9 constitute a second servosystem.

The scanning beam is generated by a second radiation source 18 arranged in the focus of a lens 18'. This beam is coupled by a reflecting element 19 to a coupling element 8, for example, a partially transparent mirror or a wavelength-selective mirror in the path of the guide beam 5. Via the reflector 9 this beam reaches the objective system 10 which forms a scanning focus 36. This scanning focus must always be positioned accurately, both in the longitudinal direction (parallel to the beam axis) with respect to a recording layer 4 to be scanned, and in the transversal direction in this layer.

Figure 2A:
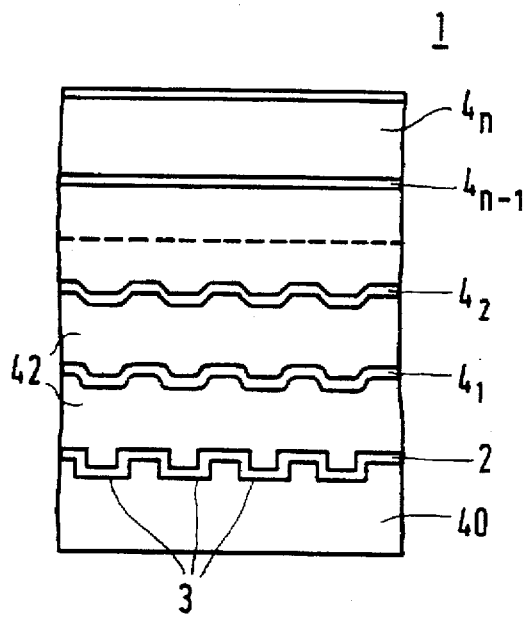
FIGS. 2a, 2b and 2c show embodiments of a record carrier having separate recording layers.

As regards the tracking information or, more in general, the guide information, a record carrier having different recording layers may in principle be implemented in different ways. FIG. 2a shows a record carrier having a guide plane 2 which can be supported by a substrate 40. The guide plane comprises guide tracks 3 in the form of continuous grooves or consisting of discrete pits having a depth of the order of 60 rim. The recording layers $4_1$ to $4_n$ are preferably 10 to 100 nm thick and are separated by means of spacer layers 42. If these spacer layers are considerably thinner than 1 μm, the contours of the guide tracks 3, which in principle are only provided in the guide plane, will also be present in the first recording layer $4_1$, the second recording layer $4_2$, and so forth, but with a strongly decreasing depth and will therefore be less suitable for tracking. Said contours are not present in the higher information layers.

Figure 2B:
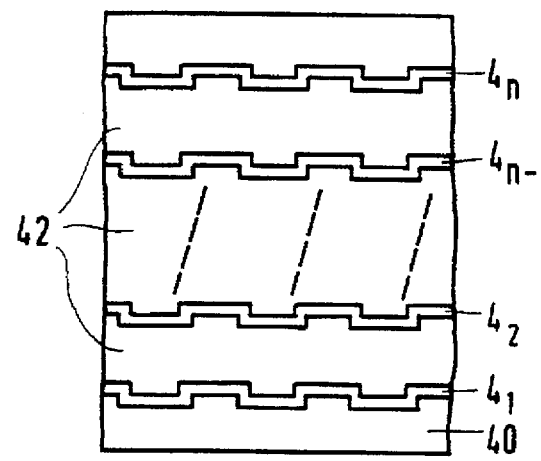
Figure 2C:
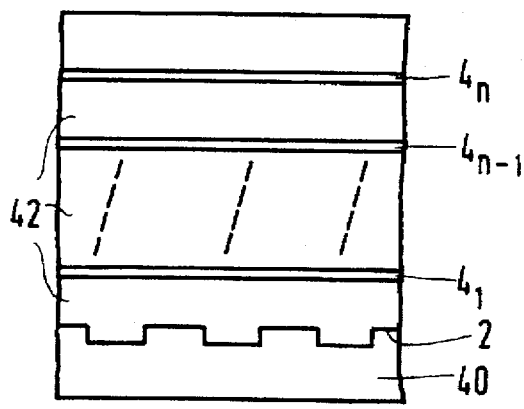

Another possibility is to provide each recording layer separately with guide information, as is shown in FIG. 2b. However, for each recording layer a replication process must be performed with the aid of a stamp, which renders the manufacture of the record carrier very expensive.

According to the invention use is made of a record carrier shown in FIG. 2a whose guide plane only is provided with guide information. When information is being written in a recording layer, use is made of this guide information which is detected and followed with the guide beam.

As already indicated hereinbefore and shown in FIG. 1b, this is realised in that the write beam is coupled into the path of the guide beam so that the write beam is passed via the pivotal mirror 9 for guiding in the transversal direction simultaneously with the guide beam. In principle, the write focus then follows the same track as the guide focus except for being offset longitudinally, while the second servosystem (13, 16, 17, 9) enables the guide focus to follow the guide tracks 3 very accurately, for example, within 100 nm.

This passive transversal control of the scanning focus is satisfactorily usable during the writing operation because in this operation it is only important for the write focus to follow the same or similar track as the guide focus. It is then unnecessary for the write focus track projected in the guide plane to coincide exactly with that of the guide focus. This would be different if a recording plane which has already been written were read by means of a read focus whose tranversal position would be coupled to that of the guide focus in the manner described hereinbefore. In this coupling the mutual position of the scanning focus and the guide focus are determined by the mutual position of the two radiation sources 5' and 18 and by the position of the beam splitters 7, 8 and 19. If the optical system between the radiation source and the focus has a magnification factor of, for example 5, the mutual distance between the radiation sources should be kept constant within, for example, 500 nm so as to follow the tracks in the recording plane within 100 nm. Due to mechanical instabilities and thermal effects, such tolerances are very difficult to realise in an apparatus.

If a record carrier is to be written with a first apparatus and read with a corresponding second apparatus, the reading operation by means of a read beam and a guide beam poses the additional problem that the deviation between the positions of the guide focus and the read focus in one apparatus is different from that in the other apparatus.

To prevent said stringent tolerance requirements and problems, the transversal position of the scanning focus is actively controlled according to the invention during the reading operation by means of read beam radiation reflected by a scanned recording plane. This radiation follows the path of the read beam in the reverse direction and is captured by a detection system 22 via the partially transparent element 19 and a lens 22'. The transversal control of the read focus is performed by a third servosystem comprising the detection system 22, a first switch 23, a servo amplifier 24 and a transversal shifter 25. The detection system 22 supplies a tracking error signal $S_{r1}$ which represents the transversal distance between the scanning focus and the centre of a track in a recording plane. When a recording plane 4 is being written, the switch 23 is open and there is no active control for the tracking of the scanning focus. During reading the switch is closed and the tracking error signal $S_{r1}$ is passed on to the amplifier 24 which in its turn applies the amplified signal to the transversal shifter 25. The shifter is an optical element which can change the direction of the scanning beam through a small angle. The objective system converts this change of direction into a change of the transversal position of the scanning focus. The tracking control of this third servosystem may be superimposed on the control of the second servosystem which operates via mirror 9.

However, it is preferable to switch off the second servosystem during reading and to cause the servo amplifier 24 to control the mirror 9 instead of the transversal shifter 25. The latter is then superfluous.

If the recording layers have a thickness of 300 to 500 nm and the spacer layers have a thickness of 0.5 to 1 µm, as proposed in Japanese Patent Application 63-234 418, there is the problem that, if the scanning beam is focused on one of the recording planes, a relatively small radiation spot is formed at the area of the adjacent recording planes due to the not infinitely small depth of focus of the beam. The depth of focus of a beam having a numerical aperture of 0.52 and a wavelength of 0.82 µm is ±1.5 µm, which means that the intensity on the optical axis, at a point 1.5 µm away from the focal point, is still a factor of 0.8 times that in the focal point. When a recording plane is being written, an adjacent plane at a distance of 1 µm will also be written, while the adjacent planes will produce strong interference signals when a recording plane is being read.

This problem could be solved by rendering the recording layers wavelength-selective and by placing a separate radiation source in the apparatus for each layer. Then a scanning beam for a given recording plane will not influence other recording planes or will not be influenced. A drawback of this solution is the limited choice of materials for the recording planes and of radiation sources having different wavelengths. This considerably limits the possible number of recording planes in the record carrier.

A better method is to render the thickness of the spacer layers 42 considerably larger than the depth of focus of the beam. However, this requires a production method which is different from that used for thin layers. Layers up to a thickness of 1 µm can be made by sputtering or vapour deposition. However, these processes are too time-consuming for thicker layers. Spin-coating is better for this purpose. The current technology does not provide the possibility of maintaining the thickness variation of spin-coated layers well within 1 µm.

Due to these thickness variations a passive longitudinal control of the scanning focus, as proposed in Japanese Patent Application 63-298836, can no longer be used. In fact, in this control the scanning focus is longitudinally placed at discrete distances from the guide focus, which distances are determined by the ordinal number of the recording layer to be scanned. In this case the distances between the guide plane 2 and the recording planes 4, and hence the thickness of the spacer layers 42 are assumed to be very accurately constant. If the variation of the thickness of the spacer layer is larger than the depth of focus of the scanning beam, the scanning focus will not always be located in the recording plane to be scanned, even if the guide focus is located in the guide plane.

According to the present invention this problem is solved by actively controlling the scanning focus during writing as well as during reading. Use is then made again of scanning beam radiation reflected by the recording layer to be scanned, which radiation is captured by the detection system 22. This system supplies a focus error signal $S_{f1}$ which comprises information about a deviation between the longitudinal position of the scanning focus and the recording plane to be scanned. The active longitudinal control of the scanning focus is performed by means of a fourth servosystem comprising the detection system 22, a recording plane selector 26, a servo amplifier 27, a second switch 28 and a longitudinal shifter 20. The recording plane selector 26 in FIG. 1a comprises a plane discriminator $26_1$ which supplies a pulse for each passage of the scanning focus through a recording plane. Use can then be made of, for example, the focus error signal which has a zero crossing at each recording plane and guide plane. If the scanning focus scans the layer packet of the record carrier, the plane discriminator will supply a pulse upon the passage of each recording plane. A counter $26_2$ counts the pulses, while the direction of movement of the scanning focus with respect to the recording planes determines whether additions or subtractions must be carried out. The output of counter $26_2$ is connected to a first input of a comparison circuit $26_3$, while the ordinal number of the selected recording layer is applied to a second input. At the instant when the desired recording plane passes, the focus error signal $S_{f1}$ is passed on to the servo amplifier 27 via a switch $26_4$ which is operated by the comparison circuit $26_3$. The output signal of this amplifier is applied to the longitudinal shifter 20 via a closed switch 28, so that the scanning focus is made to coincide with the selected recording plane. The focus control of this fourth servosystem is superimposed on the control of the first servosystem operating via objective 10. It is now possible to actively keep both the guide focus and the scanning focus in the correct plane.

Correction of Aberration

When a focused beam passes through a plate of transparent material, the plate will generate a quantity of spherical aberration in the beam, proportional to the thickness of the plate. The spherical aberration has a detrimental influence on the quality of the beam focus. The scanning focus 36 can be positioned on different layers in the record carrier 1. When the scanning focus is longitudinally shifted through the record carrier, the thickness of the record carrier material to be scanned between the objective system 10 and the scanning focus 36 will change. As a result, the quantity of spherical aberration at the location of the scanning focus changes. Apparatuses comprising an objective system 10 having a numerical aperture of 0.52 can generally allow a thickness variation of + or −50 µm without the scanning focus becoming too bad. In other words, the scanning focus has a depth range of 100 µm. If the recording planes have a mutual distance of approximately 15 µm, i.e. several times the depth of focus of the objective system, only a few recording planes can be provided in a thickness of 100 µm. If more of such recording planes are to be provided in a record carrier, the scanning focus will have to shift more than 100 82 m. Then a corrector will be required to correct the generated spherical aberration in the scanning beam. A correction for every 50 or 100 µm of longitudinal displacement of the scanning focus is generally sufficient.

A simple corrector comprises a plate of glass or synthetic material which can be placed in an uncollimated part of the scanning beam. The thickness and refractive index of the plate should be such that the quantity of spherical aberration in the scanning beam required for the correction is generated. The thickness and refractive index are dependent on the vergence of the scanning beam at the area of the plate and at the area of the record carrier.

A correction for spherical aberration in the apparatus of FIG. 1b can be performed by placing two correctors in the guide beam as well as in the scanning beam. A corrector C1, for example, a plate having areas of different thicknesses is arranged in the scanning beam 6 between the radiation source 18 and the collimator lens 18'. The scanning beam can scan any of these areas by displacing the corrector. If the thinnest part of the corrector is present in the scanning beam and the scanning focus 36 is positioned on the recording layer 4 which is farthest remote from the objective system 10, the scanning focus should be substantially free from spherical aberration. This should be realised with a special lens design of the objective system. If the scanning focus is positioned on a recording layer closer to the objective system, a thicker part of the corrector C1 must be positioned in the scanning beam so as to obtain the desired correction of the spherical aberration. If it is necessary to have a minimum aberration at the area of the detection system 22, a second corrector C2, which is comparable to corrector C1, should also be arranged between said detection system and the lens 22'. The correctors C1 and C2 should always generate an equal quantity of spherical aberration in the scanning beam. A third corrector C3 between the radiation source 5' and the collimator lens 5" should ensure that, after passage through the objective system having said special design, the guide beam 5 supplies a scanning focus 11 on the guide plane 2, which focus is free from aberrations. The same corrector C4 can be arranged in front of the detection system 13 for the same reason as the corrector C2 is arranged in front of the detection system 22. The correctors C3 and C4 can be integrated with the lens 5" and the lens 13', respectively, by giving these lenses a modified design. The spherical aberration generated by the correctors C1 and C3 in the scanning and guide beams causes the beams to flare out between the correctors and the objective system. The detrimental effects can be mitigated by shortening the optical paths of the guide and scanning beams as much as possible.

The correctors C1 and C2 may alternatively comprise a plurality of plates each having a constant thickness, one or more of which may be present in the scanning beam.

Figure 4A:
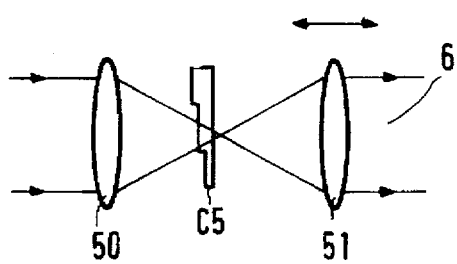
FIGS. 4a and 4b show embodiments of a longitudinal shifter.

An advantageous embodiment of the apparatus has only one corrector C5 in the longitudinal shifter 20 to be described, instead of the two correctors C1 and C2 arranged in from of the radiation source 18 and the detection system 22. As is shown in FIG. 4a, the construction of the corrector C5 can be compared with that of the corrector C1.

A further simplification is obtained if the guide plane 2 in the record carrier 1 is not the plane located closest to the objective system 10, as is shown in FIG. 1b, but if it is the farthest remote plane. The correctors C3 and C4 can then be dispensed with.

In a special embodiment the scanning apparatus using a guide beam and a scanning beam has only one corrector which is arranged between the objective lens 10 and the record carrier 1. The corrector influences the two beams at this location. The guide focus is then allowed to receive a certain quantity of spherical aberration from the corrector. This corrector increases the depth range of the scanning focus without correction at least by a factor of two.

In a multilayer plate scanning apparatus without a guide beam the aberration correction can also be performed by one adjustable corrector which is arranged between the objective lens and the record carrier.

The user data may be written in any form in the apparatus, dependent on the type of sensitive material in the recording plane: in the form of magnetic domains, in alloy phase-varied areas, in crystallisation state-varied areas, etc. The data in the recording planes can be read by means of the detection system 22 in the reflected scanning beam, which supplies an information signal $S_{i1}$ which is applied to a processing unit 32. As long as the detection system can read the data in a recording plane, there is certainly a signal which is strong enough to generate a tracking error and focus error signal for the control of the servosystems of the scanning beam. A reflection coefficient of a few percent of a recording plane is found to be sufficient already.

When reading information, a clock signal for correctly decoding the read signal must be generated in the processing unit 32. Each recording plane could be provided with synchronization marks from which the clock signal can be derived. However, if this is done during manufacture, an expensive stamping or replica from process is required for each recording layer. The record carrier therefore preferably comprises spin-coated layers without any synchronization marks stamped into them. In such a record carrier the clock signal must be generated from the information written into the recording planes. It is therefore recommended to write the data into the recording layer with a self-clocking code. The processing unit itself can then derive the clock signal from the information signal $S_{i1}$. An example of such a code is the (2,7) recording code known from U.S. Pat. No. 3,689,899.

Figure 3:
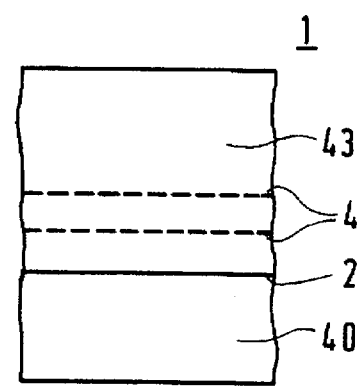
FIG. 3 shows a record carrier having an unlaminated recording volume for use in the apparatus.

A novel embodiment of a record carrier which can be used in the apparatus described is shown in FIG. 3. The single recording layer 43 has such a thickness that various recording planes 4 can be written into it. FIG. 3 shows two recording planes. Before writing, the recording plane is still undefined. Therefore, the scanning focus with which the plane is written should not only be coupled to the guide focus in the transversal direction but also in the longitudinal direction, which guide focus follows the tracks in the guide plane 2. During writing the switch 23 is open and the longitudinal position of the write focus is determined by an adjusting member 21 which is then connected to the longitudinal shifter 20 via the switch 28. This adjusting member supplies a signal which may have a number of discrete levels each corresponding to a given longitudinal position of the write focus in the recording layer 43 of the record carrier shown in FIG. 3. After a given plane 4 of this record carrier has been written, it may serve as a plane for the active focus control. The switch 28 is then in a position in which the output of the servo amplifier 27 is connected to the longitudinal shifter 20. This control is used when reading a written layer 4, while switch 23 is closed.

In a further embodiment of the record carrier the guide plane can also be provided with a sensitive layer so that this plane can also be provided with user data, thus increasing the storage capacity of the record carrier.

If various users want to have a quantity of data available which is the same for all of them (standard data) in addition to their own specific data, the manufacturer can prerecord this standard data on the record carrier, preferably in the guide plane.

Figure 4B:
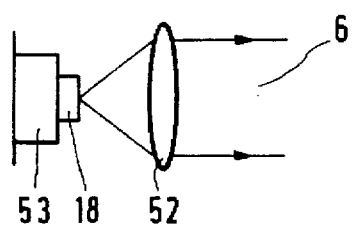

Some aspects of the apparatus will be further described. FIGS. 4a, 4b, 4c and 4d show several embodiments of the shifters 20 and 25. The longitudinal shifter of FIG. 4a has two lenses 50 and 51 producing an approximately collimated beam 6 from the radiation emitted by the source 18. The vergence of the outgoing beams can be slightly changed by a small displacement of lens 51 along the optical axis. As a result, the focus formed by the objective 10 is displaced in the longitudinal direction. When using a focus motor, which is used in a known CD player for displacing lens 51, the scanning focus 36 can be positioned on a different recording layer within a few milliseconds. The plate C5 can be arranged between the lenses 50 and 51 for correcting spherical aberration. Another embodiment of a longitudinal shifter, known from Japanese Patent Application 63-234418 is shown in FIG. 4b. The radiation from the source 18 is formed to an approximately collimated beam 6 by a collimator lens 52. The source 18 is arranged on a piezoelectric crystal 53. The laser can be displaced along the optical axis over a small distance by means of a voltage across the crystal. The vergence of the outgoing beam can thereby be varied.

Figure 4C:
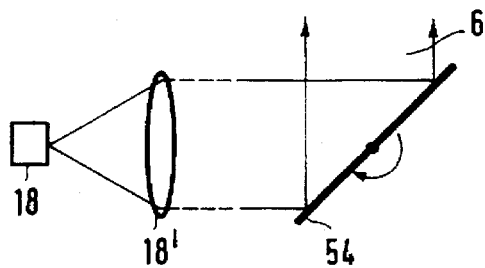
FIGS. 4c and 4d show embodiments of a transversal shifter.
Figure 4D:
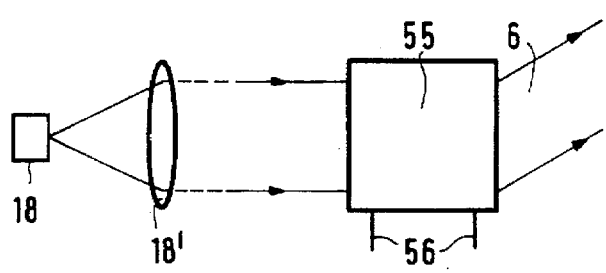

The transversal shifter of FIG. 4c comprises a folding mirror 54 which is arranged in the scanning beam 6. A rotation of the mirror changes the direction of the beam 6, which change of direction is converted by the objective into a transversal shift of the scanning focus 36. The sub-plate 19 can be used as a folding mirror if the radiation source 18 and the detection plane 22 are interchanged. The direction of the beam 6 can also be changed by means of an acousto-optical modulator 55, as is shown in FIG. 4d. The change of direction of the outgoing beam 6 is dependent on the control voltage 56 which is applied to the modulator.

The apparatus according to the invention may alternatively be formed without the transversal shifter. Instead of a separate scanning beam 6, guide beam 5 is then used for reading the recording planes. During writing the scanning beam is used together with the guide beam, while an active transversal control of the scanning beam is not necessary.

For a satisfactory operation of the apparatus it is desirable to calibrate the longitudinal and transversal shifters 20 and 25. When an unlaminated record carrier is being written, the longitudinal position of the write focus is determined by the adjusting member 21 and the longitudinal shifter 20. The inevitable variation of parameters in these components necessitates a calibration if the components are used in a non-feedback system. For the purpose of calibration the guide focus is positioned in the guide plane by means of the lens 10. Subsequently, the adjusting member 21 is adjusted in such a way that the write focus is also located in the guide plane. This can be checked by comparing the information in the signal $S_{i1}$ of the detector 22 and in the signal $S_i$ of the detector 13. Based on this calibrated adjustment, the longitudinal position of the write focus can now be changed in small steps for writing the different recording planes.

A comparable calibration of the transversal shifter 25 is to be recommended before writing in a recording plane. This is particularly desirable if the same recording plane is further to be written behind a previously written area in this recording plane. It is most likely that the transversal distance between the guide focus and the write focus at the start of the second writing action will no longer be the same as at the end of the previous writing action, which is due to adjustment variations in the apparatus. This presents the risk that the tracks to be written pass through the last-written tracks of the previous writing action. This can be avoided by means of a calibration. To this end the guide focus and the write focus are positioned in the guide plane, as described hereinbefore. Subsequently, the transversal shifter 25 is adjusted by means of an adjusting member (not shown in FIG. 1) so that the write focus is on the same track as the guide focus. This can be checked by comparing the information signals $S_i$ and $S_{i1}$ of the guide beam 5 and the beam 6, respectively. Subsequently the write focus can be moved to a recording plane to be written while maintaining the adjustment of the transversal shifter.

Figure 5:
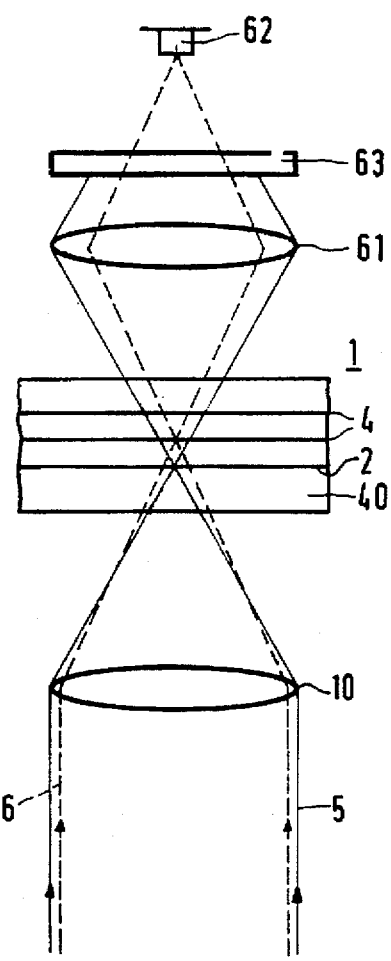
FIG. 5 shows a part of an embodiment of the apparatus for reading in transmission.

FIG. 5 shows a part of an embodiment of the apparatus in which the record carrier is read in transmission. The scanning beam 6, shown in broken lines in the drawing, now scans all layers of the record carrier 1 so that the power of the beam to be detected is independent of the recording plane on which the scanning focus is positioned. A lens 61 focuses the beam which has passed the record carrier on a detector 62, which then supplies the information signal $S_{i1}$. If the scanning beam 6 as well as the guide beam 5 are present during reading, a filter 63 is used which passes only one of the beams to the detector 62 so as to avoid disturbance of the information signal.

Such a separation between the scanning beam and the guide beam is also necessary elsewhere in the apparatus to ensure that the detection systems 13 and 22 in FIG. 1b only receive radiation from the beams 5 and 6, respectively. To this end two filters 34 and 35 are arranged around beam splitter 8. The properties of the filters depend on the way of beam separation. When radiation sources of different wavelengths are used, 34 and 35 will be chromatic filters. When different states of polarization of beams 5 and 6 are used, 34 and 35 will be polarization filters. Such filters can be satisfactorily combined to a single element with the beam splitter 8 in the form of a cube on which chromatic filters have been vapour-deposited or a cube having a polarization-sensitive splitting plane. If the beams 5 and 6 are given a slightly different direction, 34 and 35 are spatial filters. Such a filter may consist of a telescopic system having a pinhole in the focal point, or of pinholes for the detection systems 13 and 22. Combinations of the above-mentioned three beam-separating methods are alternatively possible. If the separation of the beams reflected by the record carrier and the beams emitted by the radiation sources must be accompanied by a minimal amount of radiation loss, the beam splitter 8 may be replaced. by a polarizing beam spitter and a $\lambda/4$ plate.

The detection systems 13 and 22 for generating a focus error signal $S_f$, $S_{f1}$, tracking error signals $S_r$, $S_{r1}$ and information signals $S_i$, $S_{i1}$ are only shown diagrammatically in FIG. 1b. Actually, a focus error detection system may include an astigmatic element, for example a cylindrical lens which is arranged in the path of the reflected beam, and the radiation-sensitive detection system may comprise four detection elements arranged in different quadrants. The so-called astigmatic focus error detection method as described in U.S. Pat. No. 4,023,033 is then used. The focus error signal may alternatively be obtained by means of the so-called double Foucault method in which a roof prism is arranged in the reflected beam and in which four aligned detection elements are used. The Foucault method is described in, for example, U.S. Pat. No. 4,533,826. Instead of a prism, it is alternatively possible to use a grating as described in U.S. Pat. No. 4,665,310.

The system for generating a tracking error signal may comprise a grating in the path of the beam for forming three radiation spots on the record carrier, and three radiation-sensitive elements for capturing radiation from these three radiation spots, as described in U.S. Pat. No. 3,876,842. Another method of generating a tracking error signal is the so-called differential or push-pull method described in U.S. Pat. No. 4,491,940.

The invention has been described with reference to the embodiment of the apparatus as shown in FIG. 1b, in which the scanning beam is successively used as a write beam and as a read beam. Consequently, the apparatus must have four servosystems: a focus and tracking servosystem for the guide beam and a focus and tracking servosystem for the scanning beam. In a preferred embodiment the scanning beam is used as a write beam only, while the guide beam is also used as a read beam. Since no active tracking control is required for the write beam during the writing process, three servosystems may be sufficient in this apparatus: a focus and tracking system for the guide beam and a focus servosystem for the scanning beam. In this preferred embodiment it must be possible for the guide beam to be adjusted on any desired recording plane. To this end the focus servo should include a recording plane selector 29, identical to the selector 26 described hereinbefore, which can be switched on by means of switch 30 for a reading action. It is also possible to focus the guide beam on the guide plane by means of the recording plane selector 29. The switch 30 can then be dispensed with.

It is of course possible to use various scanning beams, each with their own servosystems, in addition to one guide beam in an apparatus. It is then possible to write, read or erase two or more layers simultaneously in accordance with the inventive method. This increases the rate of data transmission.

Simplified System

Figure 6:
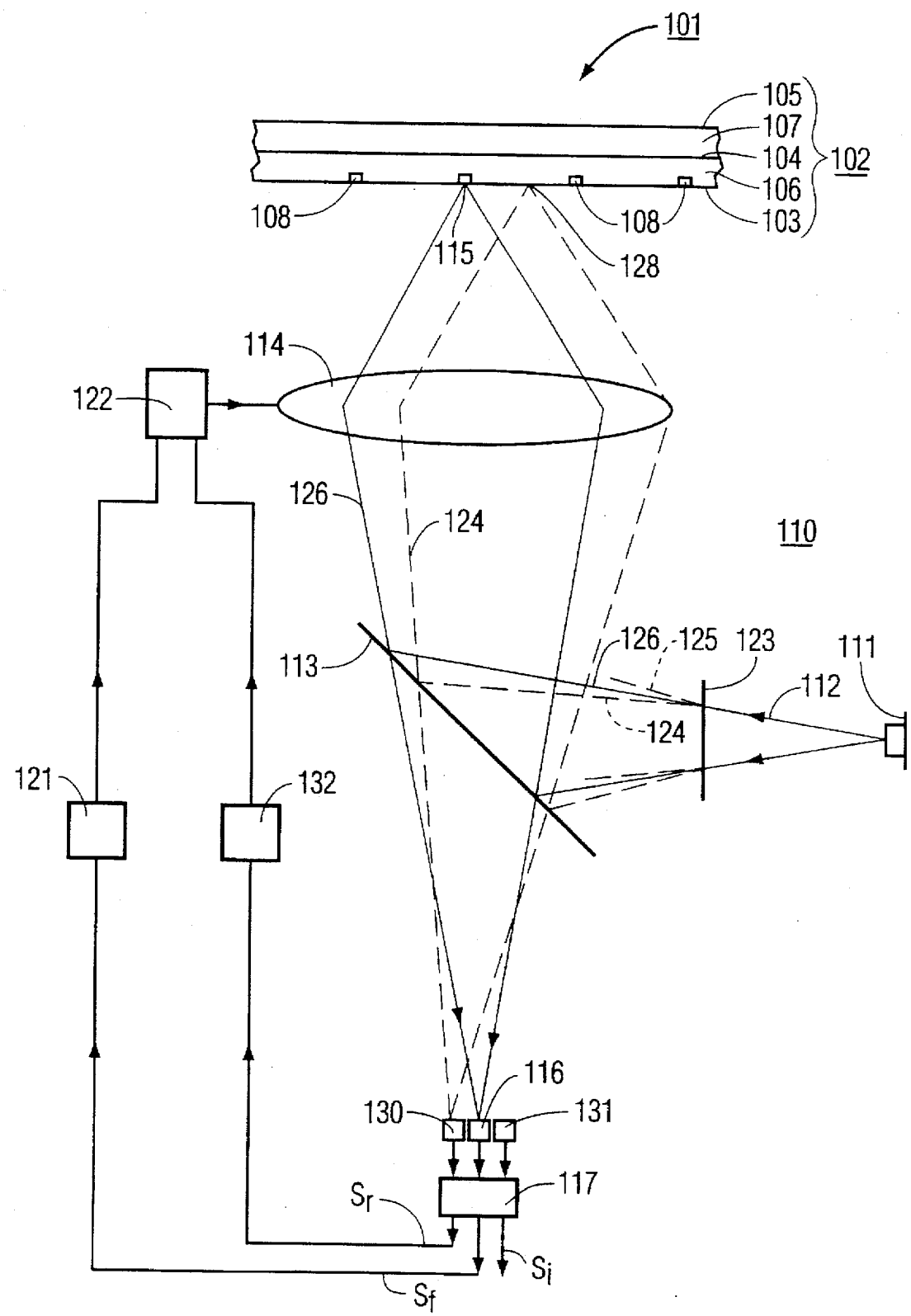
FIG. 6 shows a simplified optical information storage system according to the invention, comprising a record carrier and a scanning device.

FIG. 6 shows a simplified optical information storage system according to the invention. The system comprises a multi-layer optical record carrier 101 having a stack 102 of three information layers 103, 104 and 105, separated by transparent spacer layers 106 and 107. Each information layer reflects at least part of radiation incident on it, whereas layers 103 and 104 transmit at least part of the radiation incident on them. Each information layer has parallel tracks 108 which are perpendicular to the plane of the drawing, and indicated only for information layer 103. Information can be stored as optically readable areas (not shown in FIG. 6) between or in the tracks 108. The readable areas may comprise pits or bumps in the information layer and areas with a reflectivity or a direction of magnetization different from their surroundings. The system further comprises a device 110 for scanning the information layers. The device comprises a radiation source 111, for example, a diode laser, generating a radiation beam 112. A beam splitter 113, for example a partially transparent mirror, sends the beam towards focusing means 114, for instance an objective lens, which focuses the beam to a scanning spot 115 on one of the information layers 103, 104 or 105. Part of the radiation reflected by the information layer is transmitted to a detection system 116 via objective lens 114 and beam splitter 113. When record carrier 101 is moved with respect to scanning spot 115, in the plane of the information layers, the scanning spot will scan a track on one of the information layers. The radiation beam reflected by the information layer will be modulated by information stored in the information layer, which modulation can be detected by detection system 116. The detection system and an electronic processing circuit 117 convert the modulation in an electric information signal $S_i$, representing the information read from the record carrier. Scanning spot 115 may be positioned on a different information layer by changing the position of the spot along the optical axis of objective lens 114, for instance by changing the axial position of the objective lens or by changing the position of all the optical components of the device, i.e the radiation source, beam splitter, objective lens and detection system.

Figure 7:
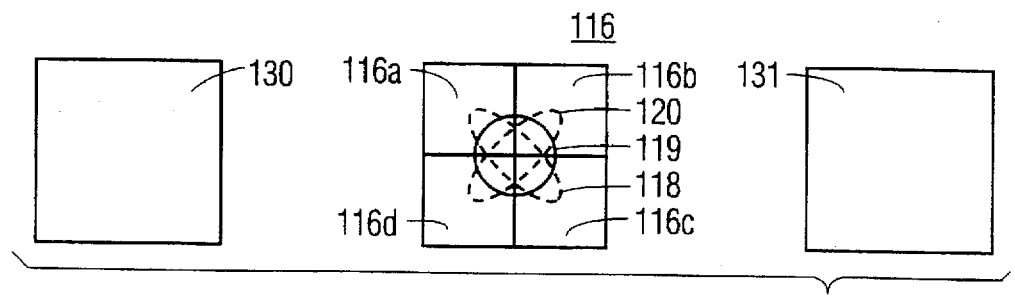
FIG. 7 shows the detection systems for the device of FIG. 6.

Device 110 is provided with a focus servosystem in order to keep scanning spot 115 properly focused on an information layer during movement of the layer with respect to the spot. A focus error signal $S_f$, i.e. a signal representing the axial distance between the scanning spot and an information layer, may be obtained by the so-called astigmatic method, known from U.S. Pat. No. 4,023,033. To this end detection system 116 is divided into four quadrants 116a, 116b, 116c and 116d, as shown in FIG. 7, each quadrant being connected to processing circuit 117. Said information signal $S_i$ may be derived from the four quadrants by summing the signals of the quadrants. For a proper detection of the focus error, device 110 introduces astigmatism in the radiation incident on detection system 116, for instance by means of beam splitter 113. As a consequence, the shape of the radiation spot on detection system 116 changes as function of the focus error between shapes 118, 119 and 120 as indicated in FIG. 7 for a scanning spot below the information layer, in focus on the information layer and above the information layer, respectively. Focus error signal $S_f$ may be derived by summing the signals from opposite quadrants to two sum signals and forming a difference signal of the two sum signals. Focus error signal $S_f$ is used as input for a focus servo circuit 121 which comprising servo electronics. The output of circuit 121 is used to control a linear motor 122 which can change the axial position of objective lens 114, thereby influencing the focus error.

Figure 8:
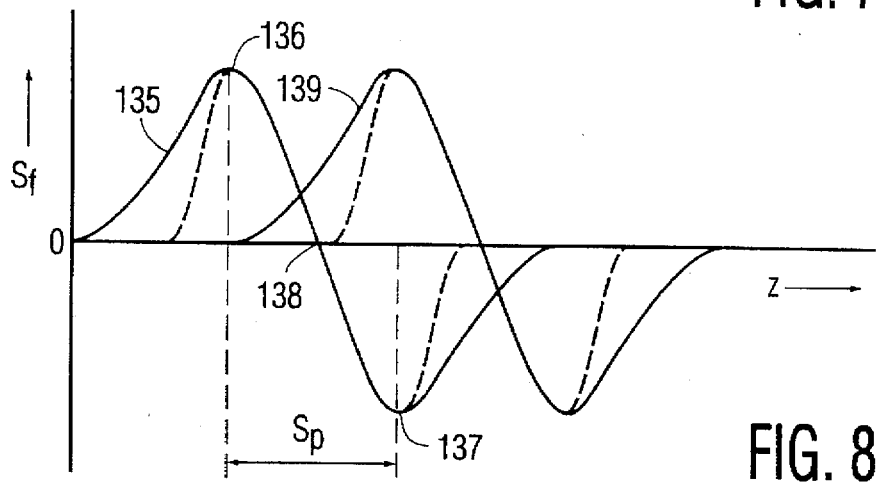
FIG. 8 shows the position of three spots on an information layer.

Device 110 is also provided with a radial servosystem in order to keep scanning spot 115 on a track of an information layer. A radial error signal $S_r$, i.e. a signal representing the distance between the centre of scanning spot 115 and the centre line of a track 108 to be scanned, may be obtained by the so-called two-beam method, known from, for example, U.S. Pat. No. 3,876,842. To this end device 110 is provided with dividing means, for instance a grating 123, positioned in radiation beam 112. The grating splits beam 112 into a $+1^{st}$, $-1^{st}$ and $0^{th}$-order beam, i.e. a first tracking beam 124, a second tracking beam 125 and a main beam 126. For the sake of clarity only the full paths of the first tracking beam and of the main beam are shown. The two tracking beams and the main beam are focused into three spots on the information layer to be scanned by the objective system 114, i.e. information layer 103 for the situation given in FIG. 6. The shift in FIG. 6 between the position of first tracking beam 124 and main beam 126 at the location of objective lens 114 has been exaggerated for the sake of clarity. FIG. 8 shows the positions of the three spots formed on information layer 103 for the case where there are no radial tracking errors. The track pitch or track period is equal to q. Track 127 is the track which the scanning spot must follow at the moment. The first and second tracking beams form tracking spot 128 and tracking spot 129, respectively. Scanning spot 15 formed by the main beam 26 is located on track 27. If them is no tracking error, as in FIG. 7, the distance between a tracking spot and the centre line of the track 127 is equal to $x_0$. The value of $x_0$ depends on the way in which a radial tracking error signal is derived from the radiation in the tracking beams. Common values are q/4, q/2 and 3q/4. As is shown in FIG. 6, the radiation of the two tracking beams 124 and 125 reflected by the information layer is transmitted to detection systems 130 and 131, respectively, via objective lens 114 and beam splitter 113. Detection systems 130 and 131 are connected to processing circuit 117, which derives radial error signal $S_r$ by subtracting the two signals from detection systems 130 and 131. Radial error signal $S_r$ is used as input for a radial servo circuit 132 which comprising servo electronics. The output of circuit 132 is used to control linear motor 122 which can also change the transverse position of objective lens 114, thereby influencing the radial error.

In general, the presence of information layers close to the information layer on which the main beam 126 is focused will affect focus error signal $S_f$ in the form of crosstalk, as will be explained with reference to FIG. 9. This figure shows focus error signal $S_f$ as a function of the axial displacement z of scanning spot 115. Curve 135 is the so-called S-curve due to information layer 103. It shows two extrema 136 and 137 and a zero-crossing 138 between the extrema. When the scanning spot is at the axial position indicated by zero-crossing 38, the scanning spot is in the plane of information layer 103. During scanning of this layer, the focus servosystem, comprising detection system 116, processing circuit 117, focus servo circuit 121 and the linear motor 122, will try to keep the scanning spot at zero-crossing 138. At the same time, neighbouring information layer 4 also generates a focus error signal with an S-curve 139, causing crosstalk on S-curve 135. The total focus error signal is the sum of the S-curves of the various information layers. S-curve 139 causes an offset at zero-crossing 138 of S-curve 135, resulting in a zero-crossing of the total focus error signal at a z-position different from the position of zero-crossing 138. In the example of the figure, scanning spot 115 will then not be located at information layer 103, but at a position intermediate between information layers 103 and 104. The offset can be avoided by increasing the spacing between information layers 103 and 104, i.e. by increasing the distance between S-curves 135 and 139. The proximity of the S-curves also causes asymmetry in the shape of the curves, which might result in capturing problems of the focus servosystem. For known devices the spacing between the S-curves must preferably be taken as at least 4 times the peak-to-peak distance $S_p$ of an S-curve to avoid said offset and asymmetry. The related minimum distance between the information layers is 4 n $S_p$, with n the refractive index of spacer layer 106 between the two information layers. The maximum distance is preferably 8 n $S_p$ in order to have a high information density of the record carrier.

In a special embodiment of the device according to the invention the minimum distance between the information layers may be further reduced by reducing the crosstalk of the focus error signals. The crosstalk is due to radiation from currently unscanned information planes and incident on detection system 116, as has been explained in the previous paragraph. Since the currently unscanned information planes do not lie in the plane of the scanning spot 115, the radiation from these planes will not be in focus on detection system 116, and therefore form a relatively large radiation spot on the radiation-sensitive surface of the detection system. The radiation-sensitive surface of detection system 116 is bounded by the outer rectangle of element 116 in FIG. 7. In the special embodiment of the device the size of the radiation-sensitive surface is made smaller than in known devices. The largest dimension of the radiation-sensitive surface is preferably smaller than 3 times the diameter of the radiation spot formed on the surface when the radiation beam is optimally focused on an information layer. Then the influence of radiation from unscanned information layers is relatively small, and, consequently, also the crosstalk. The largest dimension of the radiation-sensitive surface is preferably larger than 1.5 times the diameter of the radiation spot, because smaller dimensions will cause part of the radiation in shapes 118 and 120 in FIG. 7 to fall outside the radiation-sensitive surface, thereby reducing the magnitude of the focus error signal as well as the value of $S_p$. For detection system 116 in FIG. 7, this means that the length of the diagonal of the square radiation-sensitive surface is preferably in the range between 1.5 and 3 times the diameter of shape 119. A spot diameter of 30 μm results in a diagonal range from 45 to 90 μm with a preferred value of 60 μm.

Figure 9:
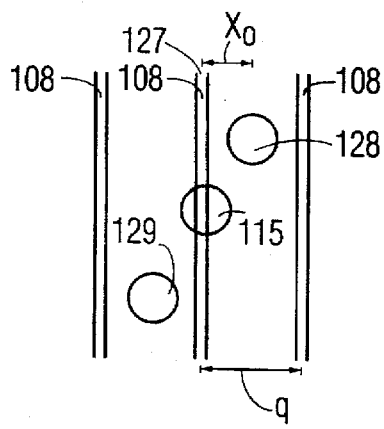
FIG. 9 shows the focus error signal as a function of the axial displacement of the scanning spot.

The effect of the small detection system 116 on the S-curves is indicated by the broken lines in FIG. 9. The total width of each S-curve is reduced to less than twice the length of $S_p$, and thereby also the crosstalk of S-curve 139 on S-curve 135. The minimum distance of information layers can now be reduced to 1.5 n $S_p$. The maximum distance is preferably 4 n $S_p$. A preferred distance within the range is 2 n $S_p$. When the peak-to-peak distance is equal to 12 μm and the refractive index of the spacer layers is 1.56, the thickness of the spacer layer is preferably between 28 μm and 75 μm, with a preferred value of 37 μm. A focus servosystem specially designed for scanning multi-layer record carriers has a peak-m-peak distance of 8 μm. This is achieved by increasing the numerical aperture of the radiation beam incident on detection system 116 and introducing an appropriate mount of astigmatism in this beam. Said 8 μm peak-to-peak distance and a refractive index of 1.56 give a preferred thickness range from 19 μm to 50 μm. A small focus offset due to crosstalk at the lower end of the ranges may be compensated by an electronic offset. The value of the electronic offset preferably depends on the thickness of the spacer layers and the reflectivity of the information layers.

Although the above discussion is based on a focus servosystem according to the astigmatic method, the invention is not limited to this method. It can be used in each system comprising a focus servosystem having an S-curve. Examples of such servosystems are disclosed in U.S. Pat. No. 4,533,826 using the Foucault or knife-edge method and in Japanese Patent Application no. 60-217 535 using the beam-size method.

The proximity of unscanned information layers close to the scanning spot also causes crosstalk in the radial error signal $S_r$, which arises in about the same way as the crosstalk in the focus error signal $S_f$. Radiation of the two tracking-beams 124, 125 reflected from the currently scanned information layer gives a reasonably small radiation spot on each of the detection systems 130 and 131. Radiation reflected from currently unscanned information layers gives a relatively large radiation spot on each detection system. The size of detection systems 130 and 131 should therefore be reduced as far as possible. The length of the diagonal of the radiation-sensitive surface of each of the detection systems preferably ranges between 1 and 3 times the diameter of the radiation spot on the surface from a tracking beam optimally focused on an information layer.

Radiation of main beam 126 reflected off currently unscanned information layers forms a radiation spot centred on detection system 116. Depending on the thickness of the spacer layers which determines the size of the spot, radiation of the spot might fall on detection systems 130 and 131. Since the intensity of the main beam is generally substantially greater than the intensity of the tracking beams, the crosstalk of radiation from the main beam on the radial error signal may be considerable. The crosstalk is reduced according to the invention by choosing the power in the main beam to be smaller than six times the power in each of the tracking beams. An improved reduction is obtained if the power in the main beam is smaller than four times the power in each of the tracking beams. The reduced power in the main beam is sufficient to write and erase information in most types of information layers.

The above two measures for reducing crosstalk between radial error signals are independent of the method used to generate the radial error signal. Examples of methods in which one or both of the above measures can be applied are the one-beam push-pull method as disclosed in U.S. Pat. No. 4,057,833, the two-beam push-pull method as disclosed in European Patent Application no. 0 201 603 and the three-beam method as disclosed in U.S. Pat. No. 3,376,842.

Spherical aberration incurred by main beam 126 in traversing material of record carrier 101 may be compensated by introducing spherical aberration of a different sign in the beam. Objective lens 114 may function as compensator by designing the lens such that it introduces the amount of spherical aberration in the beam required for a certain height of scanning spot 115 in the record carrier. Such an objective lens is known from the European Patent no. 0 146 178 (U.S. Pat. No. 4,668,056). When the height of the scanning spot deviates from the height for which the spherical aberration is compensated, additional, uncompensated spherical aberration is introduced in the main beam. It gives rise to a reduced quality of scanning spot 115 which can be expressed by a decrease r of the Strehl intensity of the scanning spot. The additional aberration is an odd function of the height deviation, resulting in a scanning spot having a different intensity distribution for an equal positive and negative height deviation. In spite of these different intensity distributions, the quality of the information signal $S_i$ turns out to depend on the inverse square value of the aberration. An equal positive and negative height deviation thus give about the same reduction in quality of the information signal. Hence, there exists a range of thicknesses with only a small reduction of the quality of the information signal, which range is located symmetrically around the thickness for which the radiation beam is compensated. The extent of the range is determined by the minimum quality of the information signal as required by the system. The extent can also be expressed in terms of the maximally permissible decrease r of the Strehl intensity due to spherical aberration. In general the designer of a scanning device will have a tolerance budget for the decrease of the Strehl intensity due to all optical aberrations. Part of the budget will be allocated to a decrease caused by spherical aberration. This part determines the extent of said range.

According to the invention stack 102 of information layers is located within the range of thicknesses with a permissible reduction of the quality of the information signal. When the heights of the outermost information layers of the stack are within the range of thicknesses, all information layers can be scanned with a well corrected scanning spot. In order to make optimum use of the range, such an mount of spherical aberration is introduced in the main beam that the scanning spot is substantially free from spherical aberration at approximately half the height of the stack. If the extent of the range, i.e. the maximum thickness of stack 102, is represented by 2d, then $$2d = \frac{34\, n^3 \lambda \sqrt{r}}{(n^2 - 1)(NA)^4}$$

in which n is the refractive index of the spacer layers, $\lambda$ is the vacuum wavelength of the radiation beam and NA is the numerical aperture of objective lens 114. If the system has the following parameter values: $\lambda=780$ nm, n=1.56, NA=0.52 and r=0.05, then 2d=215 µm. Hence, the height of the stack of information layers of the system can be up to 215 µm. All information layers in the stack can then be scanned by the device with a sufficiently corrected scanning spot. If the device has a peak-to-peak distance of the S-curve of 12 µm with an associated optimum distance of the information layers of 37 µm, then the stack can contain five information layers. It also turns out that the additional spherical aberration in the radiation beam within the extent of the range does not influence the focusing properties of the focus servo system. Hence the scanning spot can be focused properly on any information layer within the range without taking additional measures.

Figure 10:
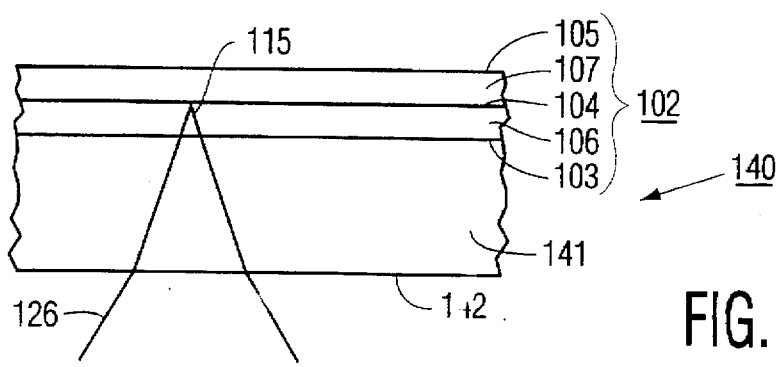
FIG. 10 shows a record carrier scanned through a substrate.

FIG. 10 shows a record carrier 140 comprising a transparent substrate 141. The substrate has on one side an entrance face 142 on which main beam 126 is incident and on the other side stack 102 comprising information layers 103, 104 and 105. The main beam is corrected for the spherical aberration introduced by a substrate having a nominal thickness and by half the thickness of stack 102. The additional spherical aberration due to thickness variations of the substrate reduces the maximum allowable thickness of the stack. For the above set of parameter values, a peak-to-peak thickness tolerance of 100 µm of the substrate and a refractive index of 1.56 of the material of the substrate, the maximum thickness of the stack is given by 215−100= 115 µm. This stack can contain three instead of five information layers. Another example of a system according to the invention with a record carrier as shown in FIG. 10, which system is less tolerant for spherical aberration, has parameter values: $\lambda=635$ nm, n=1.56, NA=0.52, $S_p=8$ µm, r=0.01 and a thickness tolerance of the substrate of 40 µm. The extent 2d of the range is then equal to 78 µm, and the maximum thickness of the stack of the record carrier is 78−40=38 µm. The optimum spacing $2\,n\,S_p$ of the information layers in the stack is equal to 25 µm. Therefore, the stack can contain two information layers. To further reduce the crosstalk due to the proximity of the layers, the spacing may be increased to 38 µm without affecting the maximum amount of information to be stored in the record carrier. The information layers of such a record carrier may be scanned by a device with a single, fixed compensation of the spherical aberration.

The refractive index of one or more spacer layers may be equal to one, i.e. the spacer is an air layer. As an example, spacer layer 106 in FIG. 10 may have a refractive index of one. The record carrier 140 then comprises substrate 142 with information layer 103 being a, for instance, embossed surface of the substrate, and information layers 104 and 105 being two surfaces of a plate constituting spacer layer 107. The plate and the substrate are kept at the required distance by means of spacer rings, which are not shown in the figure. From the above formula it is clear that the air spacer does not contribute to the spherical aberration. Hence, the maximum thickness of stack 102 is then equal to the sum of the value of 2d as calculated from the formula using the refractive index of spacer layer 107 and the thickness of the spacer layer 106, reduced by the tolerance on the thickness of the substrate if necessary.

If the refractive index of the substrate is not equal to that of the spacer layers, the maximum additional spherical aberration of the substrate must be calculated first and the resulting reduction of the Strehl intensity must be subtracted from the maximum allowed reduction due to spherical aberration. The remaining reduction can then be used to calculate the maximum thickness of the stack.

The record carrier may be provided with several stacks of information layers. A device for scanning these layers should be provided with an adjustable spherical aberration compensator, which compensator requires only one setting of the compensation for each stack of layers.

The feature of scanning a stack of information layers with a single spherical aberration compensation may be advantageously combined with the feature of the minimum distance of the information layers, thereby providing a high-density record carrier and a relatively low cost scanning device. However, the application is not limited to the combination of the two features. As an example a system using said first feature and not said second feature scans the record carrier with two radiation beams. The scanning spot of a first beam is guided by an information layer, whereas the position of the scanning spot of a second beam is coupled to the first scanning spot and scans one or more other information layers. There is no crosstalk between servo error signals, and the distance of the information layers can be reduced accordingly. The height of the stack is limited by the spherical aberration incurred by the second beam according to said first feature. An example of a system using said second feature and not said first feature comprises a spherical aberration compensator providing a separate compensation for each information layer. The minimum distance between the information layers is determined by the crosstalk on error signals for focus and/or tracking servo systems, whereas there is no requirement on the maximum height of the stack of information layers.

What is claimed is:

1. An information storage system comprising an optical record carrier having a stack of information layers alternating with spacer layers,
and a device for scanning the information layers, which device is provided with a radiation source and focusing means for selectively focusing a radiation beam from the radiation source on the separate information layers,
characterized in that the focusing means introduce such a fixed, stack-associated spherical aberration in the radiation beam that this aberration compensates the spherical aberration incurred by the radiation beam when it is focused at approximately half the height of the stack of information layers.

2. An information storage system as claimed in claim 1, characterized in that said stack of information layers has a height no greater than approximately 100 µm, and said focusing means comprises an objective system having a numerical aperture of approximately 0.52.

3. An information storage system as claimed in claim 1, characterized in that said focusing means comprises a single corrector plate only, placed in an uncollimated part of the radiation beam, for compensating spherical aberration.

4. An information storage system as claimed in claim 1, characterized in that the thickness of the stack is smaller than 2d which is a function of the refractive index of the material of the stack and of the numerical aperture of the focusing means.

5. An information storage system as claimed in claim 4, characterized in that 2d is also a function of the maximally admissible decrease of the Strehl intensity of the radiation beam due to spherical aberration.

6. An information storage system comprising an optical record carrier having a stack of information layers alternating with spacer layers,
and a device for scanning the information layers, which device is provided with a radiation source and focusing means for selectively focusing a radiation beam from the radiation source on the separate information layers,
characterized in that during reading the focusing means continuously introduces such a fixed, stack-associated spherical aberration in the radiation beam that this aberration compensates the spherical aberration incurred by the radiation beam when it is focused at approximately half the height of the stack of information layers.

7. An information system as claimed in claim 6, characterized in that said stack of information layers has a height no greater than approximately 100 µm, and said focusing means comprises an objective system having a numerical aperture of approximately 0.52.

8. An information system as claimed in claim 6, characterized in that said focusing means comprises a single corrector plate only, placed in an uncollimated part of the radiation beam, for compensating spherical aberration.

9. An information system as claimed in claim 6, characterized in that the thickness of the stack is smaller than 2d which is a function of the refractive index of the material of the stack and of the numerical aperture of the focusing means.

10. An information system as claimed in claim 9, characterized in that 2d is also a function of the maximally admissible decrease of the Strehl intensity of the radiation beam due to spherical aberration.

11. An information storage system comprising an optical record carrier having a stack of information layers alternating with spacer layers,
and a device for scanning the information layers, which device is provided with a radiation source and focusing means for selectively focusing a radiation beam from the radiation source on the separate information layers,
characterized in that:
the thickness of the stack is smaller than 2d which is a function of the refractive index of the material of the stack, of the numerical aperture of the focusing means, and of the maximally admissible decrease of the Strehl intensity of the radiation beam due to spherical aberration,
the value 2d is defined by the equation $$2d = \frac{34 \, n^3 \lambda \sqrt{r}}{(n^2 - 1)(NA)^4}$$

in which n is the refractive index of the spacer layers, $\lambda$ is the vacuum wavelength of the radiation beam, NA is the numerical aperture of the focusing means, and r is the maximally admissible decrease of the Strehl intensity due to spherical aberration, and
the focusing means introduces such a fixed, stack-associated spherical aberration in the radiation beam that this aberration compensates the spherical aberration incurred by the radiation beam when it is focused at approximately half the height of the stack of information layers.

12. An information storage system as claimed in claim 11, in which the record carrier comprises a transparent substrate having an entrance face for the radiation beam at one side and said stack at the other side, characterized in that the thickness of the stack is smaller than 2d minus the thickness tolerance of the substrate.

13. An information storage system as claimed in claim 11, wherein r is equal to 0.05.

14. An information storage system as claimed in claim 11, wherein r is equal to 0.01.

* * * * *